UNITED STATES PATENT OFFICE.

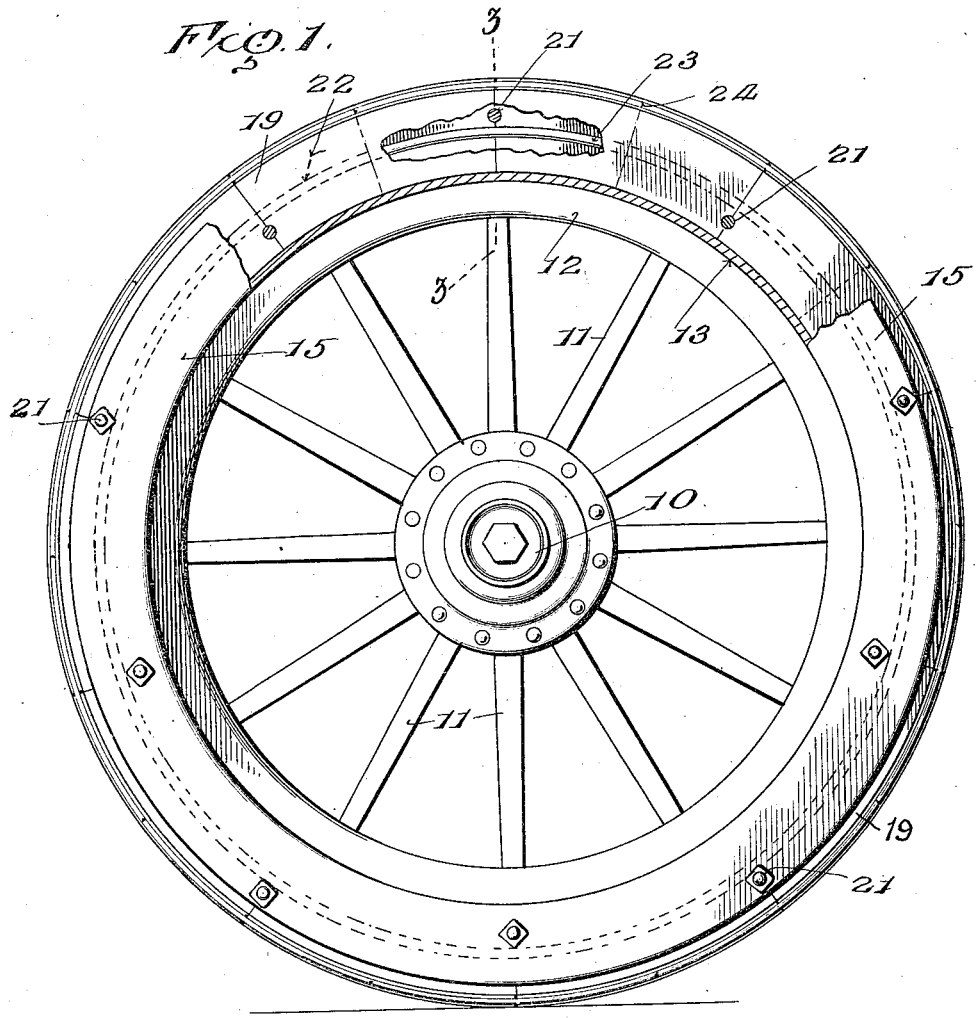
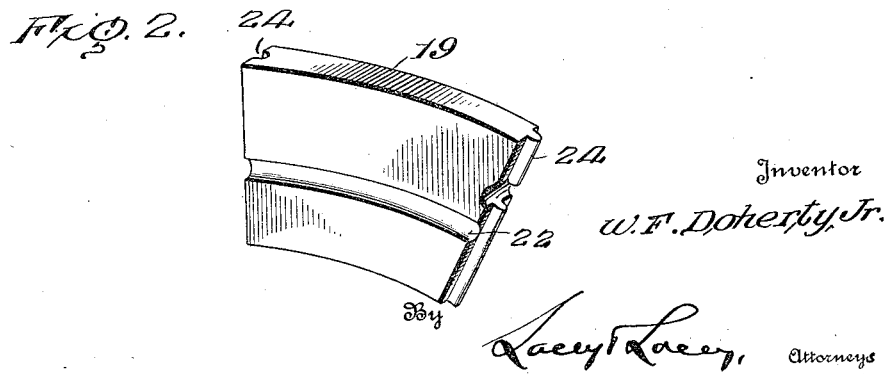

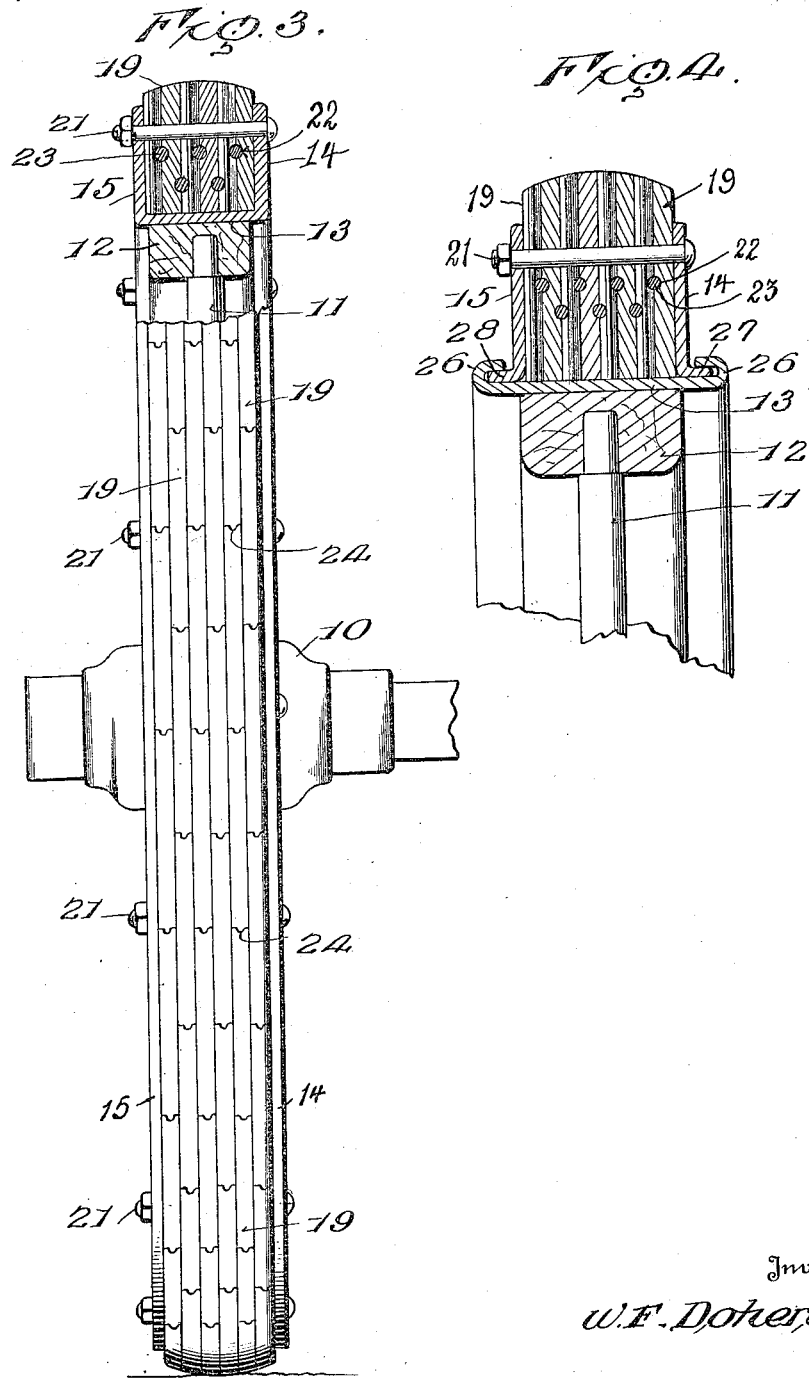

WILLIAM F. DOHERTY, JR., OF BISBEE, ARIZONA.

WHEEL-TREAD.

1,279,294.  Specification of Letters Patent.  Patented Sept. 17, 1918.

Application filed February 14, 1918. Serial No. 217,097.

*To all whom it may concern:*

Be it known that I, WILLIAM F. DOHERTY, Jr., citizen of the United States, residing at Bisbee, in the county of Cochise and State of Arizona, have invented certain new and useful Improvements in Wheel-Treads, of which the following is a specification.

This invention relates to improvements in wheel treads, and has for one of its objects to improve the construction and increase the efficiency and utility of devices of this character.

Another object of the invention is to provide a wheel tread formed of a plurality of wood units, detachably united, and held in position relatively to the felly or rim of the wheel.

With these and other objects in view, the invention consists in certain novel features of construction, as hereinafter shown and described and then specifically pointed out in the claims; and in the drawings illustrative of the preferred embodiment of the invention—

Figure 1 is a side elevation of a wheel having my improved tread attached, with a portion of the tread in section.

Fig. 2 is an enlarged detached perspective view of one of the tread units.

Fig. 3 is a front elevation of the wheel with the upper portion in section on the line 3—3 of Fig. 1.

Fig. 4 is a transverse section illustrating a modification in the construction.

The improved device may be applied to wheels of various forms and sizes, and it is not desired therefore to limit the improvement to any specific construction of wheel body, but for the purpose of illustration is shown applied to an ordinary wheel in which 10 represents the hub, 11 the spokes, and 12 the felly.

Bearing around the felly portion 12 is an endless band 13 having outwardly directed holding members or flanges 14—15 preferably integral therewith. The tread portion of the improved wheel is formed of a plurality of units 19, preferably wood and segmental in outline and disposed end to end within the space between the members 14—15 as shown in Fig. 3. The units 19 bear by their inner edges upon the member 13 and are sufficient in number when placed therein and with their side faces engaged, to completely fill the space between the holding members as shown in Fig. 3. The units 19 are arranged to "break joints" as illustrated in Fig. 3, and the confronting ends of certain of the units are provided with recesses or seats to receive transverse clamp bolts 21, the latter passing through the holding members 14, and 15. The side faces of the units 19 are also provided with segmental half-sockets 22 to receive annular binding members 23, the latter preventing displacement of the units 19 by centrifugal force. Every alternate bolt 21 will be located between the annular members 23 and the base portion 13 as shown in Fig. 1, while the remaining alternate bolts 21 will be arranged externally of the annular members 23. By reference to Fig. 3 it will be noted that the annular members 23 are arranged in "staggered" relation to avoid weakening the units. The confronting ends of the units 19 are tongued and grooved as represented at 24 to support them from transverse displacement under the severe strains to which they will be subjected. The units 19 when formed of wood will be cut with the grain radially of the wheel, so that wear thereon will be constantly endwise of the grain of the wood.

Previous to instalment on the wheel the units 19 preferably will be immersed in a water proofing compound.

In Fig. 4 a modification is shown consisting in constructing the member 13 with inwardly turned flanged edges 26 and forming the plates 14—15 with outturned inner edges 27 and 28 to engage beneath the flanges 26 and thus retain the holding members in position.

The wood units will preferably be arranged in the same manner in the modified structure as shown in Figs. 1 and 3.

Having thus described the invention, what is claimed as new is:

1. A wheel-tread comprising a plurality of annular rows of segmental units engaging end to end and face to face with the joints breaking transversely and with certain of the units provided with communicating recesses in their confronting terminals and others with intermediate transverse recesses, holding members bearing against the outer rows of units, and clamp bolts extending through the holding members and the recesses of the units.

2. A wheel tread comprising a plurality of annular rows of segmental units engaging end to end and face to face with the joints breaking transversely and with the side faces of the units provided with seats disposed in staggered relation and which communicate when the units are assembled, and annular transverse clamping means applied to said units.

3. A wheel tread comprising a plurality of annular rows of segmental units, each unit having a tongue at one end thereof adapted to fit in a groove formed in the end of an adjacent unit, said units engaging end to end and face to face with the joints breaking transversely, annular clamping bands interposed between the rows of segmental units, and fastening devices extending transversely through the units and disposed alternately above and below the annular clamping bands.

4. A wheel tread comprising a band having spaced upstanding retaining flanges and a plurality of annular rows of segmental units arranged face to face between the flanges, each of said units being provided at one end thereof with a tongue and at its other end with a groove adapted to receive the tongue of an adjacent unit, and means for retaining the annular rows of units between the flanges.

5. A wheel tread comprising a holding member and a plurality of annular rows of segmental units mounted on the holding member, each unit having one end thereof provided with a tongue and its other end provided with a groove adapted to receive the tongue of an adjacent unit and the opposite side faces of the units being provided with segmental grooves disposed at different elevations, annular transverse clamping members seated in said segmental grooves and fastening devices piercing the units and the holding member for preventing accidental displacement of said units.

In testimony whereof I affix my signature.

WILLIAM F. DOHERTY, Jr.

Copies of this patent may be obtained for five cents each, by addressing the "Commissioner of Patents, Washington, D. C."